(12) United States Patent
Eichhorn et al.

(10) Patent No.: US 6,533,442 B2
(45) Date of Patent: Mar. 18, 2003

(54) BEAM LIGHT UNIT FOR VEHICLES

(75) Inventors: Karsten Eichhorn, Ennigerloh (DE); Detlef Korff, Lippstadt (DE); Roland Lachmayer, Bad Sassendorf (DE); Burkhard Woerdenweber, Lippstadt (DE)

(73) Assignee: Hella KG Hueck & Co., Lippstadt (DE)

( * ) Notice: Subject to any disclaimer, the term of this patent is extended or adjusted under 35 U.S.C. 154(b) by 0 days.

(21) Appl. No.: 09/731,808

(22) Filed: Dec. 8, 2000

(65) Prior Publication Data

US 2001/0014024 A1 Aug. 16, 2001

(30) Foreign Application Priority Data

Dec. 8, 1999 (DE) .......................................... 199 59 035
Jun. 7, 2000 (DE) .......................................... 100 28 282

(51) Int. Cl.⁷ ................................................ F21V 9/00
(52) U.S. Cl. ................. 362/511; 362/509; 362/523; 362/551; 362/546; 362/549; 362/511; 362/581
(58) Field of Search ................. 362/509, 511, 362/523, 551, 546, 549, 581; 385/901, 88, 92, 902

(56) References Cited

U.S. PATENT DOCUMENTS

| | | | |
|---|---|---|---|
| 1,626,626 A | * | 5/1927 | Rawak |
| 1,652,340 A | * | 12/1927 | Adair |
| 3,558,872 A | * | 1/1971 | Hough et al. ............ 240/41.55 |
| 3,683,167 A | * | 8/1972 | Rishton ....................... 362/581 |
| 4,321,658 A | * | 3/1982 | Deverrewaere ............. 362/292 |
| 4,389,698 A | * | 6/1983 | Cibie ........................... 362/32 |
| 4,811,172 A | * | 3/1989 | Davenport et al. ............ 362/61 |
| 4,868,718 A | * | 9/1989 | Davenport et al. ............ 362/32 |
| 5,184,883 A | * | 2/1993 | Finch et al. ................... 362/32 |

FOREIGN PATENT DOCUMENTS

| | | | | |
|---|---|---|---|---|
| DE | A1-3047816 | | 9/1981 | |
| DE | A1-4313914 | | 11/1994 | |
| GB | 2238109 A | * | 5/1991 | ............ B60Q/1/34 |

* cited by examiner

Primary Examiner—Sandra O'Shea
Assistant Examiner—Sharon Payne
(74) Attorney, Agent, or Firm—Birch, Stewart, Kolasch & Birch, LLP

(57) ABSTRACT

A beam light unit for vehicles, having a light module with a light source and a reflector, includes a downstream light output element to produce a predetermined light distribution. The light output element is mounted in a housing that leaves only a light outlet face of the light output element exposed, with sidewalls of the housing being in contact with jacket walls of the light output element immediately adjacent the light outlet face. Edge contours of the sidewalls correspond to a form of an edge of the light outlet face.

19 Claims, 4 Drawing Sheets

BEAM LIGHT UNIT FOR VEHICLES

BACKGROUND OF THE INVENTION

This application claims a priority based on German applications 199 59 035.4, filed on Dec. 8, 1999, and 100 28 282.2, filed on Jun. 7, 2000, and the contents of those applications are incorporated herein by reference.

This invention relates to a beam light unit for vehicles having a light module with a light source and a reflector and having a downstream light output element to produce a predetermined light distribution.

German Patent Application DE 43 13 914 A1 discloses a beam light unit for vehicles having a housing in which a plurality of light output elements are arranged side by side. Each light output element serves to produce a predetermined light distribution. The light output elements are connected by a light guide to a light module which has a light source and a reflector. With the known beam light unit, no measures are provided for making the light output element sturdy and resistant to external environmental influences.

It is therefore an object of this invention to improve upon a beam light unit for vehicles such that the beam light unit has a sturdy and compact structure and is resistant to external environmental influences.

SUMMARY OF THE INVENTION

According to principles of this invention a light output element is mounted in a housing that exposes only a light outlet area of the light output element, with sidewalls of the housing being in direct contact with, or sealed with, jacket walls, or flat sidewalls, of the light output element adjacent to the light outlet face, with a front contour of the sidewalls corresponding to a shape of an edge of the light outlet face.

A particular advantage of this invention is that a sealed and secure mounting of the light output element is assured due to the housing walls which are in direct contact in an area of side surfaces of the light output element. A basic idea of this invention is to achieve a hermetic seal of lateral and rear faces of the light output element with respect to the environment, so that a risk of moisture condensing on these surfaces of the light output element is largely ruled out. In this way, an unwanted effect on reflective properties of the walls of the light output element can be reliably avoided.

According to a particular embodiment of this invention, the housing is structured in one piece in the form of a tunnel with a through hole, so that the housing walls extend around the light output element and form a seal, protecting the light output element from external ambient influences. The beam light unit is thus advantageously compact and simple to manufacture.

According to one embodiment of this invention, the housing is rotatably mounted in a U-shaped holding element that can be connected to a vehicle body part, thus assuring that the light unit can be easily aligned about a rotational axis. The legs of the U-shaped holding element are advantageously structured with spring resiliency, so that the housing or a light-output-element receptacle can be snap-locked onto the holding element.

According to another embodiment of this invention, the housing includes a continuous seal which is provided at a front edge area between the rest of the housing on the one hand and the adjacent jacket walls, or flat sidewalls, of the light output element, guaranteeing a tight seating of the light output element in the housing that remains stable over a long period of time.

According to another embodiment of this invention, the seal is made of a rubber elastic material which can adapt to the shape of the light output element.

According to another embodiment of this invention, the seal is integrally molded on an inside of the rest of the housing, so that by inserting the light output element into the opening in the housing, a secure seating of the light output element is guaranteed.

Additional advantages of the present invention are derived from other embodiments.

BRIEF DESCRIPTION OF THE DRAWINGS

Further benefits, characteristics and details of the invention are explained in more detail below using an embodiment shown in the drawings. The described and drawn features, can be used individually or in preferred combinations in other embodiments of the invention,. The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 1:
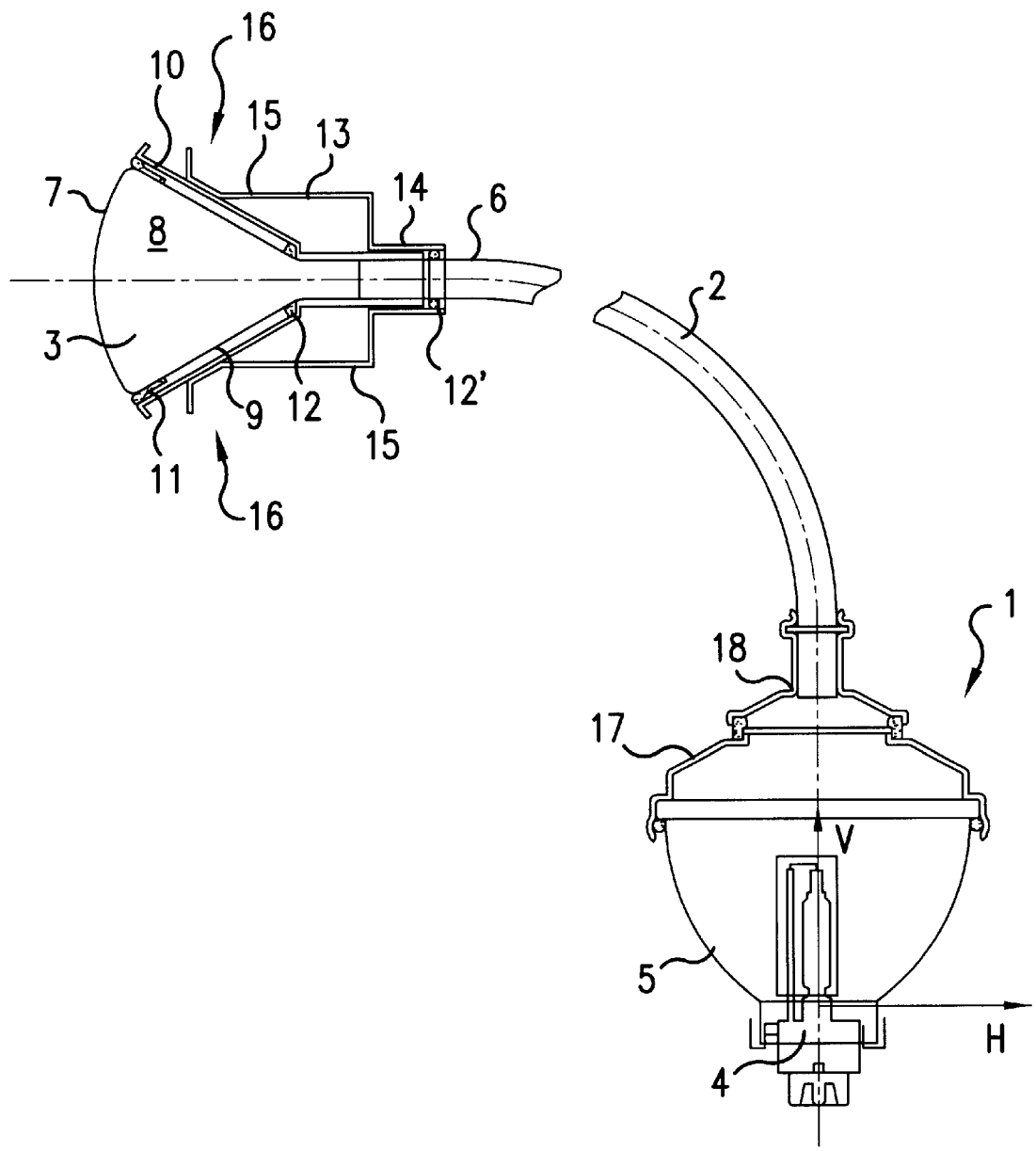
FIG. 1 is a partially-cutaway schematic side view of a beam light unit according to a first embodiment of this invention.
Figure 2:
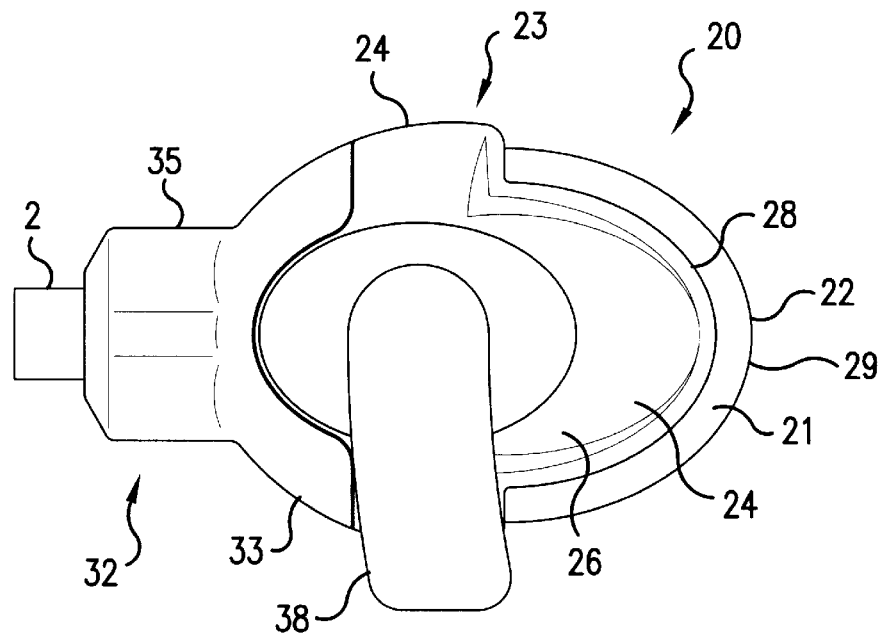
FIG. 2 is a schematic side view of a beam light unit according to a second embodiment of this invention.
Figure 3:
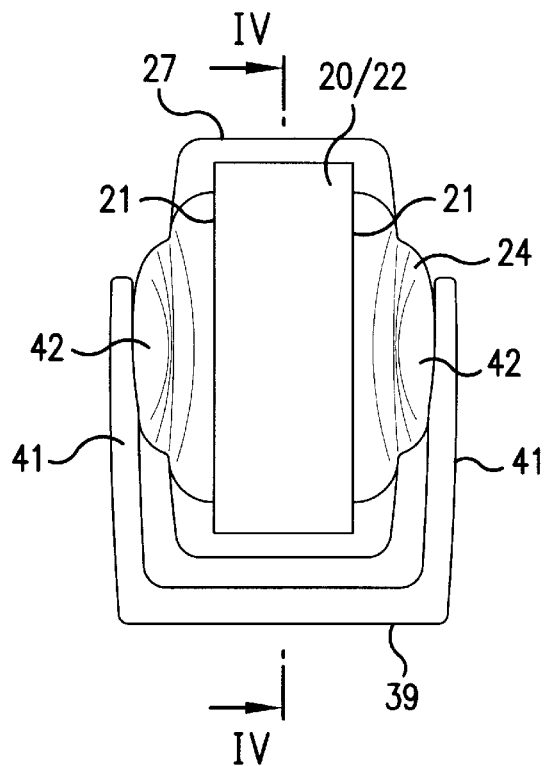
FIG. 3 is a front view of the beam light unit of FIG. 2.
Figure 4:
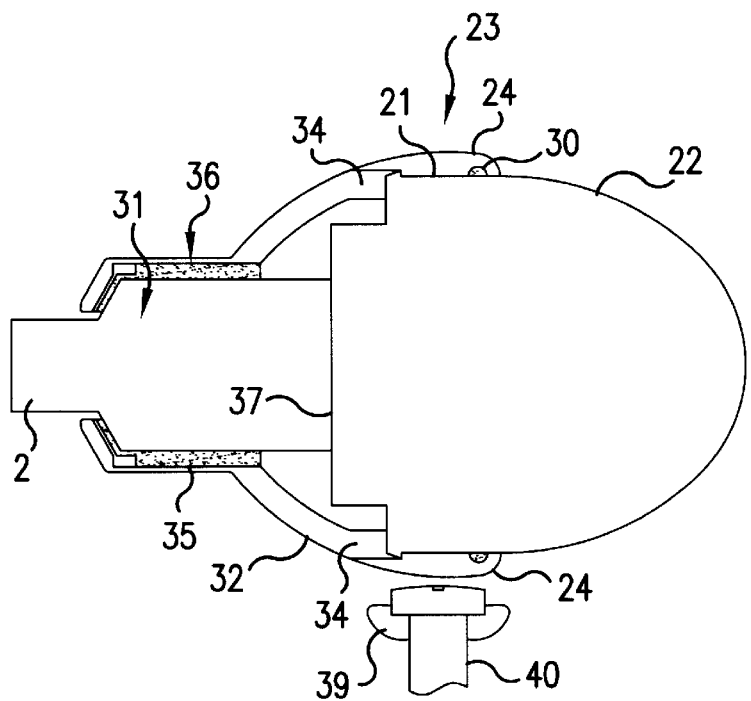
FIG. 4 is a longitudinal partial section taken on line IV—IV of the beam light unit if FIG. 3.
Figure 5:
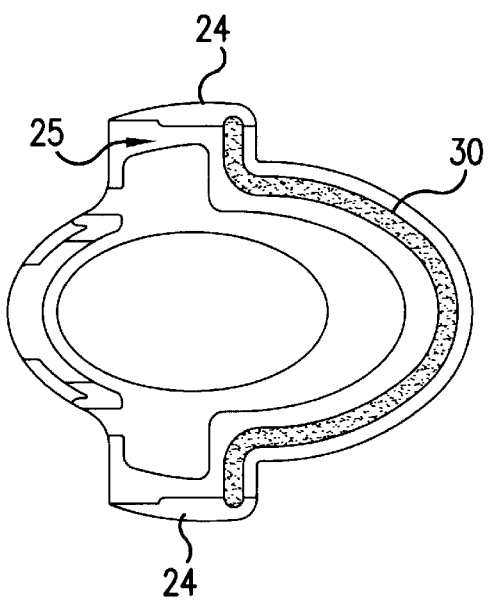
FIG. 5 is a longitudinal section taken on line IV—IV in FIG. 3, but only showing a light-output-element receptacle and a gasket arranged between the receptacle and a lateral face of the light output element.

A beam light unit for vehicles includes primarily a light module 1 which is connected by a light guide 2 to a light output element 3. The light module 1 has a light source 4 arranged at a focal point of an elliptical reflector 5. Light produced by the light source 4 is focused by the reflector 5 on a light input face of the light guide 2 so that the light is transmitted into the light guide 2, is output into the light output element 3 at the other end 6 thereof and is then radiated through a light outlet face 7 of the light output element 3 so that a desired light distribution is achieved.

The light output element 3, according to this embodiment, serves to produce a widely diffused light distribution, for example, as a fog light. It has two parallel sidewalls 8 which are linked together opposite one another by perpendicular walls 9 which diverge from one another in a light-propagation direction. Since the perpendicular walls 9 are rectangular in shape, the light output element 3 is also structured with a rectangular cross section. The light outlet face 7 is convex in shape relative to a plane perpendicular to the sidewalls 8.

To protect against mechanical stresses, the light output element 3 is mounted in a housing 10 which is adapted to the shape of the light output element, completely surrounding the light output element 3. Only the light outlet face 7 of the light output element 3 and a rear connecting part to the light guide 2 are exposed.

To prevent moisture from penetrating into the housing 10, the housing includes a gasket 11 in the form of a peripheral gasket flush at a front edge of the housing 10, extending between the edge of the rest of the housing and the light output element 3. The gasket 11 is made of a rubbery elastic material which is integrally molded onto an inside of the rest of the housing 10, preferably by a two-step injection molding method. This provides a stationary and position-secure arrangement of the gasket 11, which simplifies insertion of the light output element 3 into the housing 10.

In a rear area of the light output element 3, where the light output element 3 becomes a cylindrical part, another gasket is structured as an O-ring 12, which is arranged between the inside of the housing 10 and the light output element 3. It extends in a circle around the light output element 3 and facilitates central positioning of the light output element 3 inside the housing 10. The O-ring 12, like gasket 11, is injection molded onto the inside of the housing 10.

The housing 10 is mounted in a pot-shaped housing receptacle 13, having a connector 14 which can be snap-locked onto the end 6 of the light guide 2. The housing receptacle 13 has two opposing catch arms 15 which engage with recesses (not shown) in perpendicular walls in a connection area 16 and by forming a radial force component pressing against the opposing perpendicular walls. This provides a self-locking mount of the housing 10 in the housing receptacle 13. The light output element 3 is mechanically protected in this way and can be easily attached into a vehicle body opening of a vehicle because of the simple geometric structure (rectangular shape) of the housing receptacle 13. The light output element 3 therefore has a sturdy and compact structure, with the housing receptacle 13 also serving as a buffer with respect to unwanted collisions.

In a rear area of the connection 14, it is sealed by another O-ring 12 with respect to the light guide 2, so that no moisture can penetrate into the housing 10 or the housing receptacle 13 from the back side.

As shown in FIG. 1, the light module 1 has a housing 17 which is connected to a light-guide receptacle 18. The light guide 2 is structured as a flexible light guide 2.

Figure 6:
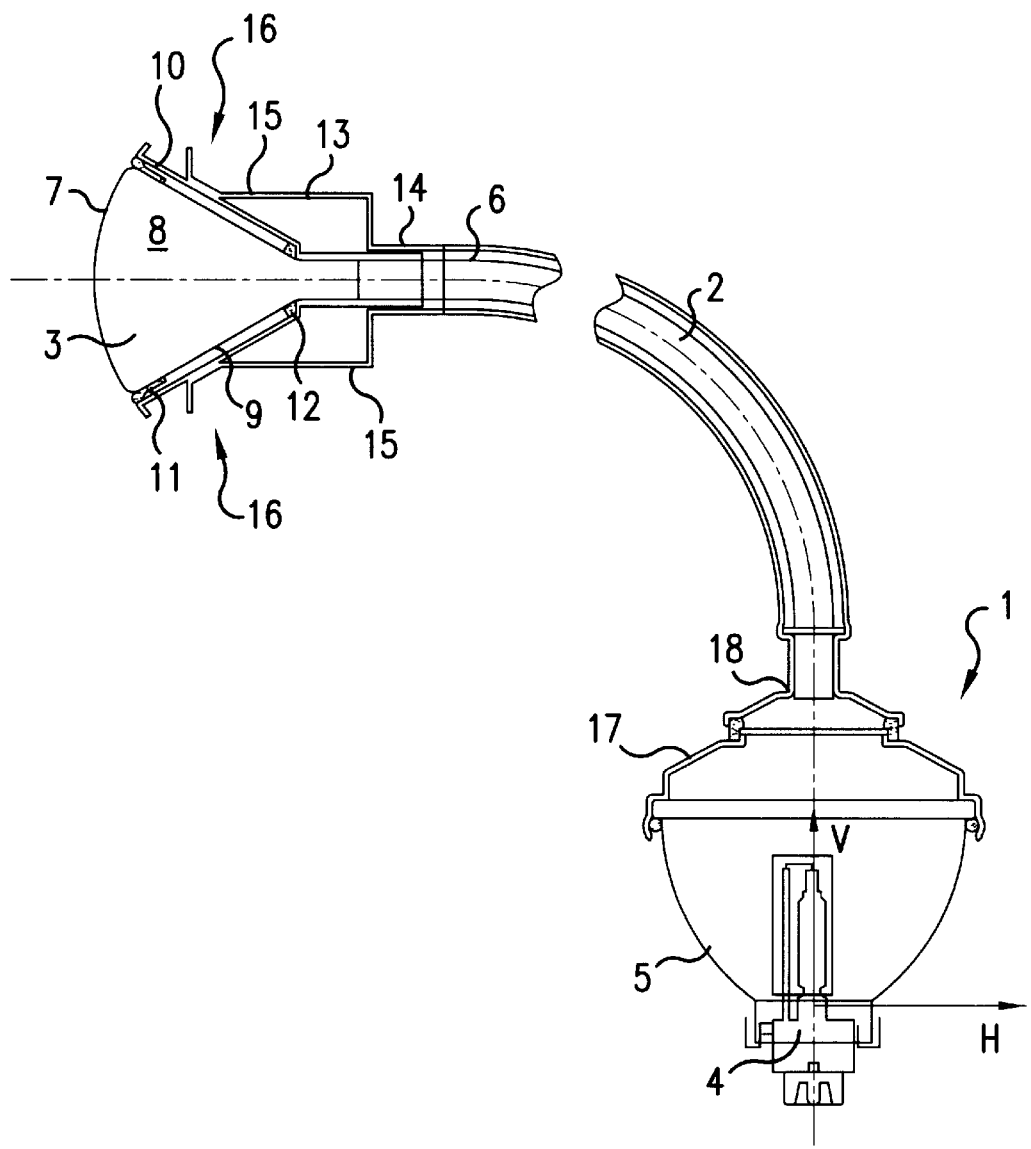
FIG. 6 is a view similar to FIG. 1 in an alternate embodiment.

According to an alternate embodiment, the light guide 2 may also be structured to be rigid and straight, so that the light-guide receptacle 18 and/or the housing 10 may be connected in one piece to the housing receptacle 13. FIG. 6 depicts the light-guide receptacle 18 and the housing receptacle 13 connected as one piece, although the light guide is not straight. For this case, the O-rings 12' may be omitted. The same is true of an embodiment in which the light module 1 is connected directly to the light output element 3, omitting the light guide 2. The light output element 3 is made of a light-transmissive, or transparent, material, preferably glass or Polymethylmethacrylate PMMA, with a back side being reflectively coated.

As an alternative, the housing 10 may also be held inside the housing receptacle 13 by a screw connection. Both the housing 10 and the housing receptacle 13 are made of a relatively rigid, non-transparent plastic material.

The beam light unit according to this invention is preferably suitable as an auxiliary automotive beam light which is subsequently mounted on a vehicle body, preferably in a body opening.

With a one-piece structure of the housing receptacle 13, the light-guide receptacle 18 and the housing 17 of the light module 1, it is possible in an advantageous manner to reduce the cost of achieving a seal for the light output element 3.

According to another embodiment of the beam light unit according to FIGS. 2 through 5, a light output element 20 has a fog light function. The light output element 20 has two opposing parallel jacket walls 21, or flat sidewalls, at whose surfaces beams of light input by the light guide 2 are totally reflected internally before leaving the light output element 20 through a curved light outlet face 22 of the light output element 20. In a rear area 23 of the light output element 20, the curved light output face 22 transitions into a straight face which is also a jacket wall 21 which does not output light.

The light output element 20 is mounted in a one-piece housing 24 which sealingly grips about the jacket walls 21 of the light output element 20. The housing 24 is structured as a tunnel-shaped light-output-element receptacle with a through hole 25 to accommodate the light output element 20. The light-output-element receptacle housing 24 has long and short sidewalls 26 and 27 which lie directly on the jacket walls 21 of the light output element 20. In this regard, the long and short sidewalls 26, 27 essentially cover the flat, or even, jacket walls 21 of the light output element 20. A front contour 28 of the long and short sidewalls 26, 27 substantially corresponds to an edge 29 of the light outlet face 22 of the light output element 20. Thus, the entire surface of the light output element 20 except for the light outlet face is sealingly, and protectively, covered.

To increase the sealing effect, the housing 24 has a surrounding gasket 30 in the area of the front contour 28 of the sidewalls 26, 27, extending between the sidewalls 26, 27 and the jacket walls 21 of the light output element 20, where it is compressed.

For an accurately-positioned light-technical coupling of the light output element 20 to a cylindrical end 31 of the light guide 2, a light-guide receptacle 32 is provided, having a C-shaped fastening element 33 on a side facing the light output element 20, the fastening element being attached to a rear side of the light-output-element receptacle 24 by a form-fitting or clamping action. To this end, an outer edge 34 of the C-shaped fastening element 33 engages at a rear area of the through hole 25 with, for one thing, the inside of the light-output-element receptacle 24 contacting it and, for another thing, butt engagement being made at a rear side of the light output element 20.

To assure a sealed and secure seating of the cylindrical end 31 in the light-guide receptacle 32, it has a hollow cylindrical shoulder 35 in which the cylindrical end is clamped by a sleeve 36 surrounding a circumferential surface thereof. The sleeve 36 may be made of a flexible material.

The cylindrical end 31 is supported in the light-guide receptacle 32 in such a way that an end face 37 of the cylindrical end 31 is in surface contact with a rear end of the light output element 20.

For mounting the light unit on a vehicle body part (not shown), a U-shaped holding element 38 is provided which can be attached at a middle area 39 to the body part by a screw 40. The holding element 38 has opposing spring legs 41 with openings into which are snap connected bulges 42 on the long sidewalls 26 of the light-output-element receptacle 24. An imaginary connecting line between the bulges 42, or openings, in the leg ends 41 forms an axis of rotation which is perpendicular to an optical axis and intersects it. Preferably, the axis of rotation extends horizontally so that a height of the housing 24 with the light output element 20 is adjustable.

The light outlet face 22 of the light output element 20 may have a coating to prevent abrasion. The coating may be produced by spraying or molding onto the light outlet face 22 or by applying a film.

We claim:

1. A beam light unit for vehicles, said beam light including:
    a light module with a light source and a reflector; and a
    downstream light output element with a light outlet face to produce a predetermined light distribution;
    where in the light module and the light output element are interconnected by a light guide;
    wherein the light output element (3, 20) is mounted in a housing (10, 24) so that only the light outlet face (7, 22) thereof is exposed, with sidewalls (26, 27) of the housing (10) directly contacting jacket walls (21) of the light output element (3, 20) adjacent where the jacket walls adjoin the light outlet face (22), with edge contours (28) of the sidewalls (26, 27) corresponding to a shape of an edge (29) of the light outlet face (22),
    wherein a rear side of the light output element (20) is adjacent to an end face (37) of the light guide (2).

2. The beam light unit of claim 1, wherein the housing (10) has a light-output-element receptacle (24) constructed of one piece surrounding the light output element (20), said light-output-element receptacle (24) having a through hole (25) in which the light output element (20) is held in a form-fitting manner.

3. The beam light unit of claim 1, wherein the housing (10) has a light-output-element receptacle (24) and wherein is further included a U-shaped holding element (38) for rotationally mounting the light-output-element receptacle (24) on a vehicle body part by engaging at least opposing sidewalls (26) of the light-output-element receptacle (24).

4. The beam light unit of claim 3, wherein the U-shaped holding element (38) has opposing spring legs (41) which engage the light-output-element receptacle (24) with a clamping action.

5. The beam light unit of claim 1, wherein a rear side of the light output element (20) is in direct contact with an end face (37) of a light guide (2), where a cylindrical end (31) of the light guide (2) is mounted in a sleeve (36) which is positioned in a hollow cylindrical shoulder (35) of a light-guide receptacle (32) with a clamping action.

6. The beam light unit of claim 5, wherein the housing (10) has a light-output-element receptacle (24) and wherein the light-guide receptacle (32) has a fastening element (33) with a C-shaped longitudinal section on the side facing the light output element (20), connected in a form-fitting manner to the light-output-element receptacle (24).

7. The beam light unit of claim 1, wherein the housing includes a gasket contacting the light output element in an area near the front contour of the sidewalls.

8. The beam light unit of claim 7, wherein the gasket is made of a rubber elastic material.

9. The beam light unit of claim 7, wherein the gasket is integrally molded on the inside of the housing.

10. The beam light unit of claim 1, wherein the housing (10) is held in a self-locking mount in a housing receptacle (13).

11. The beam light unit of claim 7, wherein another gasket (12, 12') is arranged on a side of the housing facing away from the light outlet face (7).

12. The beam light unit according to claim 1, wherein a light guide (2) is provided and is connected by a snap connection to the housing and also to the light module (1).

13. The beam light unit of claim 1, wherein the housing (10) has a light-output-element receptacle (24) constructed of one piece surrounding the light output element (20), said light-output-element receptacle (24) having a through hole (25) defined by walls having a shape to interlock with a shape of the light output element (20) so that the light output element (20) is held in the through hole in a form-fitting manner.

14. The beam light unit of claim 1, wherein the housing (10) has a light-output-element receptacle (24) and wherein is further included a U-shaped holding element (38) for rotationally mounting the light-output-element receptacle (24) on a vehicle body part by engaging at least opposing sidewalls (26) of the light-output-element receptacle (24).

15. The beam light unit of claim 3, wherein the U-shaped holding element (38) has opposing spring legs (41) which engage the light-output-element receptacle (24) with a clamping action.

16. The beam light unit of claim 1, wherein a cylindrical end (31) of the light guide (2) is mounted in a sleeve (36) which is positioned in a hollow cylindrical shoulder (35) of a light-guide receptacle (32) with a clamping action.

17. The beam light unit of claim 1, wherein the housing (10) has a light-output-element receptacle (24) and wherein the light-guide receptacle (32) has a fastening element (33) with a C-shaped longitudinal section on the side facing the light output element (20), said fastening element (33) having a shape for interlocking with a shape of said light-output-element receptacle (24) so that said fastening element (33) is connected in a form-fitting manner to the light-output-element receptacle (24).

18. The beam light unit of claim 1, wherein the housing includes a gasket contacting the light output element in an area near the front contour of the sidewalls.

19. The beam light unit of claim 7, wherein the gasket is made of a rubber elastic material.

* * * * *